(12) United States Patent
Sugai et al.

(10) Patent No.: US 8,574,693 B2
(45) Date of Patent: *Nov. 5, 2013

(54) HEAT-RESISTANT POLY-L-LACTIC ACID PREFORM

(75) Inventors: Masahiro Sugai, Isehara (JP); Masato Suzuki, Isehara (JP); Hiromi Shimura, Isehara (JP); Junichi Chiba, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 12/308,946

(22) PCT Filed: May 16, 2007

(86) PCT No.: PCT/JP2007/060049
§ 371 (c)(1),
(2), (4) Date: Feb. 9, 2009

(87) PCT Pub. No.: WO2008/012981
PCT Pub. Date: Jan. 31, 2008

(65) Prior Publication Data
US 2009/0226655 A1 Sep. 10, 2009

(30) Foreign Application Priority Data
Jul. 28, 2006 (JP) .................................. 2006-206473

(51) Int. Cl.
C04B 35/113 (2006.01)

(52) U.S. Cl.
USPC ........ 428/35.7; 428/36.6; 428/36.9; 264/632; 264/634

(58) Field of Classification Search
USPC ........ 428/35.2, 35.7, 36.9, 36.6; 525/61, 437; 206/524.7, 484; 264/362, 364
See application file for complete search history.

(56) References Cited

U.S. PATENT DOCUMENTS

| | | | |
|---|---|---|---|
| 6,484,879 B2 * | 11/2002 | Desmarais et al. | 206/524.7 |
| 7,351,785 B2 * | 4/2008 | Matsumoto et al. | 528/354 |
| 2006/0255049 A1 * | 11/2006 | McCarthy et al. | 220/703 |
| 2006/0276617 A1 * | 12/2006 | Yano et al. | 528/272 |

FOREIGN PATENT DOCUMENTS

| | | |
|---|---|---|
| JP | A-61-24447 | 2/1986 |
| JP | A-8-244781 | 9/1996 |
| JP | A-2001-354223 | 12/2001 |
| JP | A-2004-91684 | 3/2004 |
| JP | A-2004-244457 | 9/2004 |
| JP | A-2005-139270 | 6/2005 |
| JP | A-2005-200600 | 7/2005 |
| JP | A-2007-126630 | 5/2007 |

OTHER PUBLICATIONS

Poly(lactic acid): synthesis, structures, properties, processing, and application. Wiley. pp. 4.1-4.2.4 and 19.1.*
Mar. 1, 2011 Office Action issued in JP 2006-206473 (with Translation).
Jun. 20, 2012 Office Action issued in Canadian Patent Application No. 2,658,794.

* cited by examiner

*Primary Examiner* — Ellen S Raudenbush
(74) *Attorney, Agent, or Firm* — Oliff & Berridge, PLC

(57) ABSTRACT

A preform is formed by compounding a resin made from poly-L-lactic acid with a functional filler and subjecting a mouth portion to a heat treatment. Also, a hollow shaped product is produced by blow-molding the preform.

9 Claims, 4 Drawing Sheets

HEAT-RESISTANT POLY-L-LACTIC ACID PREFORM

TECHNICAL FIELD

This invention relates to a preform obtained by compounding a functional filler into a resin made from a poly-L-lactic acid and then subjecting to a heat treatment.

RELATED ART

PET bottles become world-widely popular as a revolutionary container and are applied for soybean sauce, water for food, drinking water, light drinks and beers, which largely contribute to civil life and circulation. Moreover, the progression of plastics including PET bottles highly contributes to human life and industrial activity, whereas it becomes noticed as a factor causing environmental issues such as depletion of recent petroleum sources, global warming and so on.

As a countermeasure for these issues, it is attempted to develop plastics from botanical resources being a renewable resource. A polylactic acid resin is one of biodegradable resins obtained from renewable materials such as corn, potato and the like, and has excellent transparency and hardness and possesses properties similar to polystyrene currently and widely used in food containers and the like.

In the container field are most frequently used PET bottles. Even in this field, the development of biodegradable resins is anticipated as a key word for solving the resource-waste issues. However, the development for use in the bottle is not promoting contrary to the anticipation at the present time.

Since the polylactic acid is a crystalline polymer, it is low in the melt viscosity required for the shaping of the bottle and has no temperature stability and further slow in the crystallization rate and long in the shaping cycle. On the other hand, a method of lowering the crystallinity is adopted for increasing the melt viscosity to attain the stabilization, but such a method has drawbacks that the crystallinity is too low and the heat resistance of the resulting shaped product is deteriorated. Since the polylactic acid resin presently used has Tm=155° C. and a crystallinity of about 16%, there can not be expected the improvement of the heat resistance by the crystallization. In order to develop a bottle using the polylactic acid as a starting material, therefore, it is required that the behavior of the melt viscosity for maintaining the shapability is improved but also problems such as increase of crystallinity and fine reduction of crystal particle size are solved.

As an example of preparing a container or preform using the polylactic acid resin, there is a report that a resin film of a polyvinyl alcohol-based coating agent is formed on a surface of a container made from polylactic acid (Patent Document 1). Patent Document 1 uses the polylactic acid as a material for the container, but is to improve the barrier property instead of the heat resistance. There is also an example of preparing a hollow shaped product formed by compounding polylactic acid resin and polyacetal resin (Patent Document 2). In Patent Document 2, the hollow shaped product having excellent mechanical properties, heat resistance, impact resistance, gas barrier property and transparency is obtained by rendering the two different resins into the compatibility, but the thermal crystallization or the like is not conducted.

Patent Document 1: JP-A-H08-244781
Patent Document 2: JP-A-2004-91684

SUMMARY OF THE INVENTION

It is, therefore, an object of the invention to develop bottles made from polylactic acid resin not having the aforementioned problems and improving the crystallinity in a mouth portion and having as good heat resistance.

In order to achieve the above object, the invention provides a preform characterized by compounding a resin made from poly-L-lactic acid with a functional filler and subjecting a mouth portion to a heat treatment as well as a hollow shaped product through blow molding of such a preform.

Further, the invention provides a method of producing a preform which comprises steps of compounding a resin made from poly-L-lactic acid with a functional filler, preparing a resin shaped body through an extrusion molding, compression molding or injection molding of the resin compounded with the functional filler and subjecting a mouth portion of the shaped body to a heat treatment.

In the preform characterized by compounding a resin made from poly-L-lactic acid with a functional filler and subjecting a mouth portion to a heat treatment according to the invention, the crystallinity is improved and the heat resistance is good. In the invention, the thermal crystallization of the poly-L-lactic acid resin itself is made possible by compounding the functional filler, and hence the improvement of the heat resistance in the mouth portion is attained.

BEST MODE FOR CARRYING OUT THE INVENTION

Figure 1:
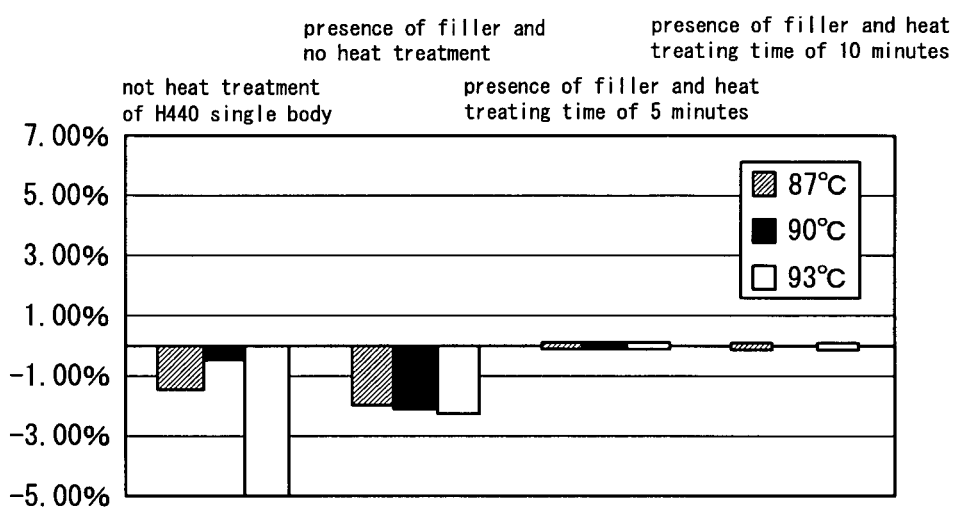
FIG. 1 is a graph showing influences of functional filler and whitening in H-440 upon a ratio of change in an outer mouth diameter during the heating.

The inventors have made various studies and discovered that the property of melt viscosity is rendered into a range suitable for blow molding by adding a resin having a high L-form content and made from poly-L-lactic acid having a high crystallinity with a functional filler comprising D-lactic acid strongly interacting therewith. Also, the improvement of the heat resistance is attained by crystallizing a shaped bottle after the shaping. Furthermore, the properties, addition ratio and the like of the functional filler are optimized for preventing the bottle from opacifying by crystallization. Moreover, the heat resistance, properties and transparency are improved by reducing the size of crystal particles as small as possible and raising the crystallinity as limit as possible.

As previously mentioned, the invention provides a preform characterized by compounding a resin made from poly-L-lactic acid with a functional filler and subjecting a mouth portion to a heat treatment. In the following examples, LACEA (registered trademark) H440 and LACEA H400 made by Mitsui Chemicals, Inc. are used as a resin made from poly-L-lactic acid, and the use of these resins is a preferable embodiment of the invention. However, the resin made from poly-L-lactic acid for use in the object of the invention is not limited thereto, and Nature Works 7000D, 7032D and the like made by Nature Works LLC may be used.

In a preferable embodiment of the invention, the polylactic acid has a number average molecular weight of 60,000-80,000. When the number average molecular weight is within the above range, it is possible to preferably shape hollow shaped products such as bottles and so on.

The functional filler is preferably obtained by graft polymerization of a compound having 2-4 hydroxyl groups with 1-100 molecules of D-lactic acid. In the functional fillers, it is preferable that 30-50 molecules of D-lactic acid is graft-polymerized, and it is most preferable that 50 molecules of D-lactic acid is graft-polymerized. In the invention, the thermal crystallization can be made by the formation of a stereo-complex between D-lactic acid included in the functional filler and L-lactic acid in the resin, whereby the target effects such as heat resistance and the like are obtained. The feature that it is preferable to graft-polymerize about 50 molecules of D-lactic acid is confirmed by a differential scanning calorimetry (DSC).

Moreover, when the polymerizing quantity of D-lactic acid is not more than 10 molecules, the formation of stereo-complex in H400+pentaerythritol could not be confirmed by DSC. Further, when the polymerizing quantity of D-lactic acid is not less than 50 molecules, the crystal of the stereo-complex itself becomes large, from which is further crystallized a homopoly-lactic acid, so that there may be unfavorably a tendency of being opacified.

In the invention, the compound in the functional filler is preferable to be sugars selected from polysaccharides and oligosaccharides. Particularly, the oligosaccharide is preferable to be a pentasaccharide. As a concrete example of the preferable sugars may be mentioned monosaccharides such as glucose, fructose and the like; disaccharides such as sucrose and the like; and polysaccharides such as starch, cyclodextrin and the like. In a further preferable embodiment of the invention, the compound in the functional filler is an inorganic compound such as silica nonoparticles or the like, or an organic compound selected from polyethylene glycol, trimethylol propane and pentaerythritol.

In the invention, the amopunt of the functional filler compounded is preferably 5-20% by weight, more preferably 10% by weight per the poly-L-lactic acid. If the functional filler is added in an amount of not less than 30% by weight, the viscosity in the injection molding becomes low and hence there is caused a problem in the workability of the secondary shaping. Moreover, the formation of the setreo-complex between the filler and the lactic acid resin is confirmed by DSC when the amount of the filler compounded is 5% by weight, 10% by weight or 20% by weight.

The heat treatment in the invention is preferable to be carried out at a temperature of from a glass transition temperature (Tg) to a melting point (Tm), concretely at a temperature of about 60° C. to about 160° C. Particularly, it is preferable that the heat treatment is carried out above a peak temperature of an isothermal crystallization, concretely at a temperature of 110° C. to 120° C.

In a further preferable embodiment of the invention, one or more melting peaks are existent in addition to the melting point of the resin single body made from poly-L-lactic acid as measured by the differential scanning calorimetry (DSC). The melting point of the resin single body made from poly-L-lactic acid is about 145° C. to 170° C. As shown in the following examples, however, one or two melting peaks are observed even at a higher temperature of from about 180° C. to 200° C. by compounding the functional filler.

The melting peak observed at a temperature higher than that of the resin single body made from poly-L-lactic acid shows that L-lactic acid of the resin and D-lactic acid of the filler form a stereo-complex. The thus formed stereo-complex affects the crystallization behavior of the poly-lactic acid resin and contributes to the promotion of the crystallization, and hence the improvement of the heat resistance can be attained.

Further, hollow shaped products may be prepared by blow molding of the preform according to the invention, which is within a scope of the invention. Moreover, the method of blow-molding the preform is well-known in this field. The blow molding method in biaxial orientation is preferably used without limiting thereto.

According to the invention, the preform is produced by the production method comprising steps of compounding a resin made from poly-L-lactic acid with a functional filler, preparing a resin shaped body through extrusion molding, compression molding or injection molding of the resin compounded with the functional filler and subjecting a mouth portion of the shaped body to a heat treatment. The method for extrusion molding, compression molding or injection molding and the heat treating method of the mouth portion are also well-known in this field.

EXAMPLES

The following examples are given in illustration of the invention and are not intended as limitations thereof.

Example 1

As a polylactic acid resin is used a polylactic acid of a grade having a slow crystallization rate (PLA) (LACEA H440 made by Mitsui Chemicals, Inc.). On the other hand, a functional filler is used by graft-polymerizing pentaerythritol having 4 functional groups with 50 molecules of D-lactic acid. A preform is prepared by adding 10% of the functional filler to PLA. Then, a mouth portion of the preform is crystallized to confirm its heat resistance.

Moreover, the crystallization conditions are as follows:
(1) Preform: 500 ml
(2) Temperature set in a heater: 300→490° C.
(3) Heat treating time: 5 minutes or 10 minutes
(4) Temperature of a mouth portion at an outlet of a furnace: 81-126° C.

A sample used in this test is as follows:
(1) H440 single body (no heat treatment)
(2) H440+10% filler (no heat treatment)
(3) H440+10% filler (heat treating time: 5 minutes)
(4) H440+10% filler (heat treating time: 10 minutes)

Moreover, the heat treated H440 single body indicates a poor appearance due to the fusion and can not be used as a sample for evaluation.

As an evaluation method, the mouth portion is immersed in a hot water of 87° C., 90° C. or 93° C. for 5 minutes to measure a dimensional change of the mouth portion before and after the immersion. That is, there are measured a ratio of change in an outer diameter of the mouth portion, a ratio of change in an inner diameter of the mouth portion, a ratio of change in a diameter of the threaded portion, a ratio of change in a diameter of a bead portion, a ratio of change in a diameter under a bead portion, a ratio of change in a neck ring diameter and a ratio of change in a neck height during the heat treatment.

Figure 2:
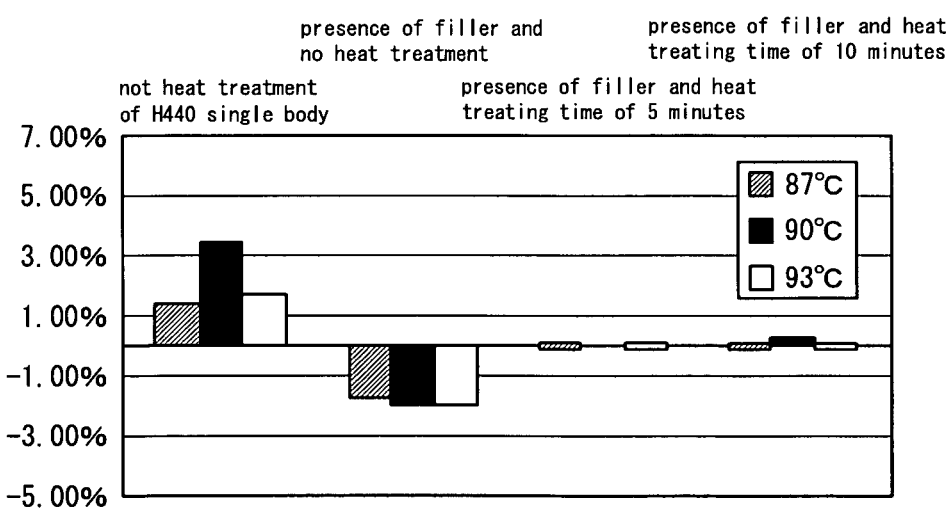
FIG. 2 is a graph showing influences of functional filler and whitening in H-440 upon a ratio of change in a diameter of a threaded portion during the heating.
Figure 3:
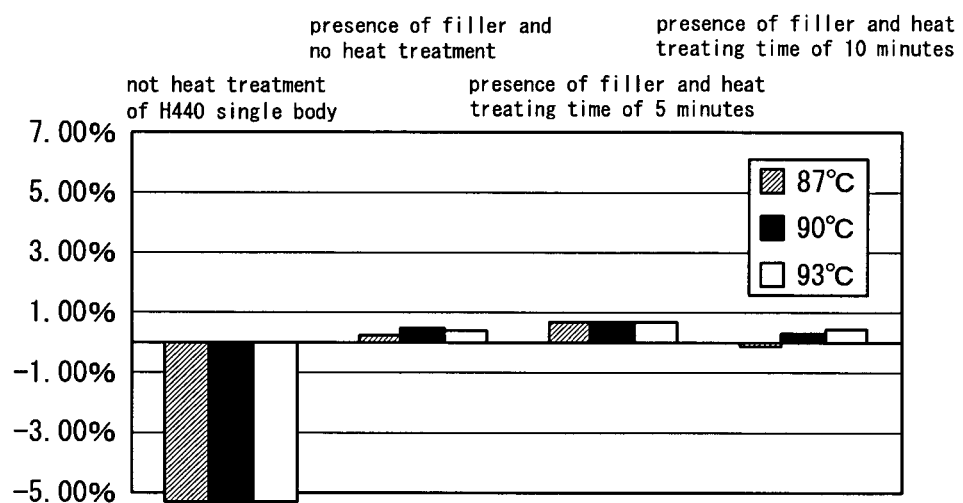
FIG. 3 is a graph showing influences of functional filler and whitening in H-440 upon a ratio of change in a neck height during the heating.
Figure 4:
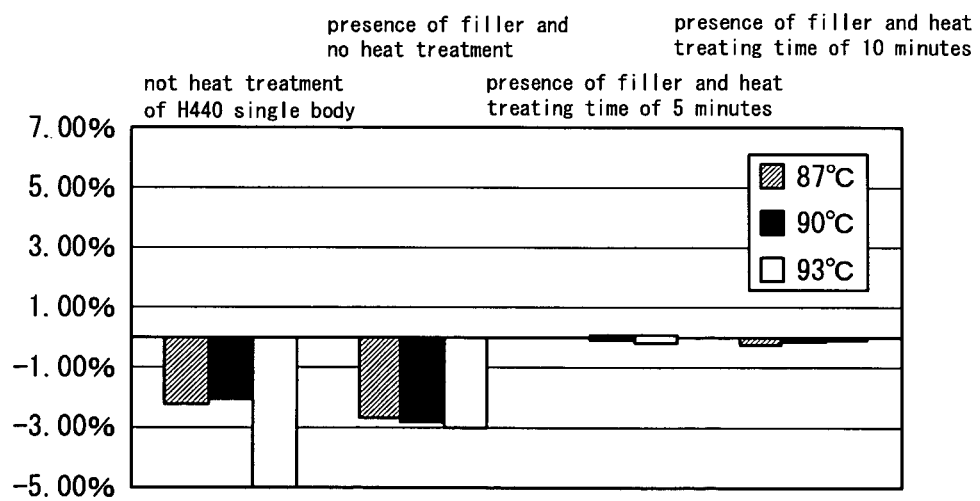
FIG. 4 is a graph showing influences of functional filler and whitening in H-440 upon a ratio of change in an inner mouth diameter during the heating.

The results are shown in FIGS. 1-4. In the system crystallized by adding the filler, the change of the size in all portions is hardly observed even in the heating at 87° C., 90° C. or 93° C. Therefore, the preform having a good heat resistance is obtained by subjecting the mouth portion of the preform comprised of PLA and the functional filler to the heat treatment. Moreover, the change of the size in PLA added with the filler prior to the heat treatment is smaller than that in PLA single body not added with the filler prior to the heat treatment. The heat resistance is clearly increased by the heat treatment, and is good in the system subjected to the heat treatment for 10 minutes.

Example 2

The polylactic acid or H440 used in Example 1 is a product consisting essentially of L-lactic acid and containing about 5% of D-form. Moreover, it is known that a slight amount of D-lactic acid contained in the poly-L-lactic acid influences on the crystallinity. Now, in order to examine the relationship between the crystallinity and the heat resistance of the polylactic acid resin, LACEA H400 made by Mitsui Chemicals, Inc. having a D-form content of about 2% and a high crystallinity is used to conduct the examination of the heat resistance in the same manner as described above.

A sample used in this test is as follows:
(1) H400 single body (no heat treatment)
(2) H400 single body (heat treating time: 10 minutes)
(3) H400+10% filler (no heat treatment)
(4) H400+10% filler (heat treating time: 10 minutes)

Figure 5:
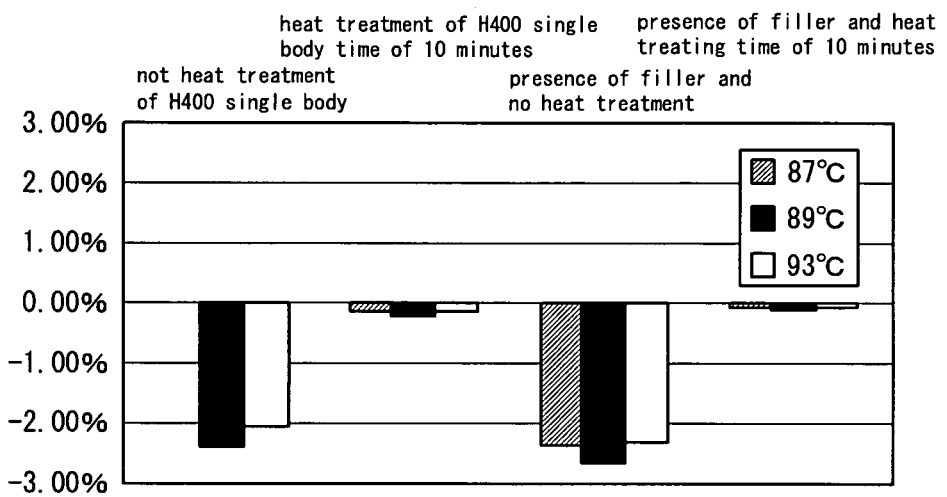
FIG. 5 is a graph showing influences of functional filler and whitening in H-400 upon a ratio of change in an outer mouth diameter during the heating.
Figure 6:
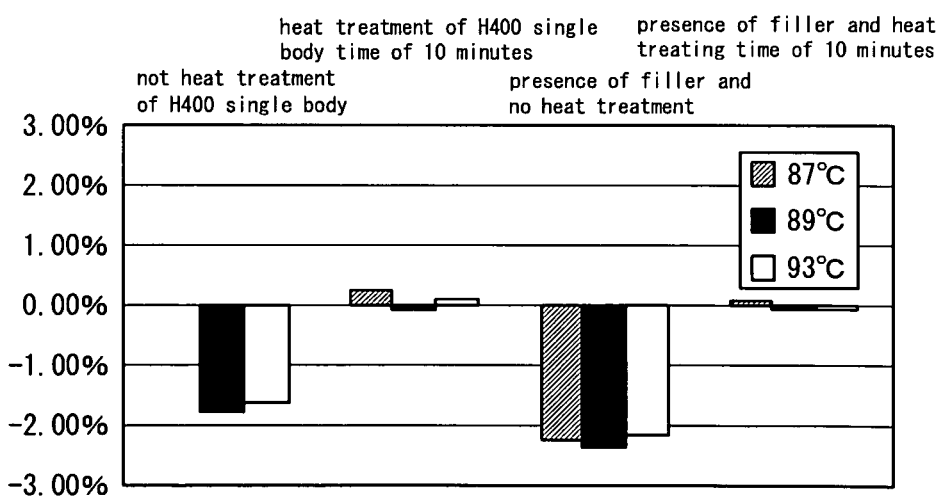
FIG. 6 is a graph showing influences of functional filler and whitening in H-400 upon a ratio of change in an outer mouth diameter during the heating.
Figure 7:
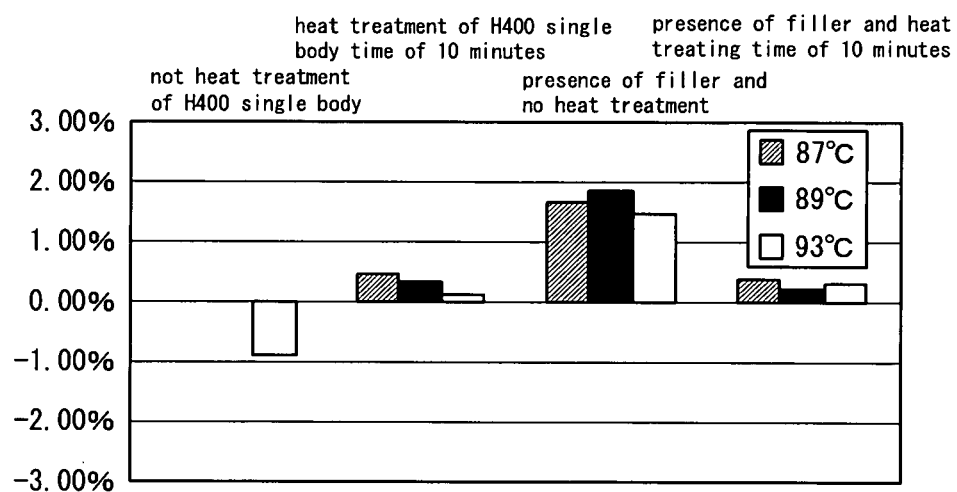
FIG. 7 is a graph showing influences of functional filler and whitening in H-400 upon a ratio of change in a neck height during the heating.
Figure 8:
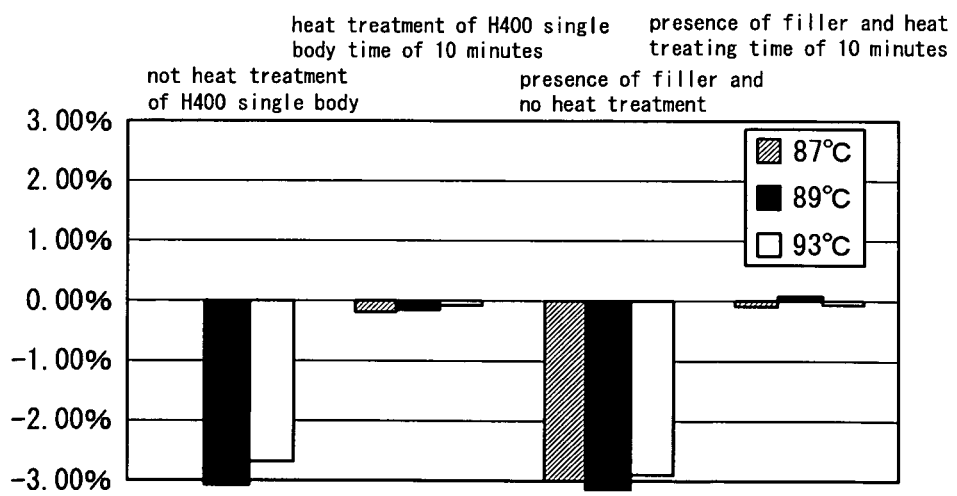
FIG. 8 is a graph showing influences of functional filler and whitening in H-400 upon a ratio of change in an inner mouth diameter during the heating.

The results are shown in FIGS. 5-8. Even in H400, the high heat resistance is confirmed even in the heating at 87° C., 90° C. or 93° C. by conducting the heat treatment after the addition of the functional filler. Moreover, since H400 is high in the crystallinity, the heat resistance equal to that of H440 added with the functional filler is obtained by the heat treatment irrespectively of the addition of the functional filler. Also, the improvement of the isothermal crystallizing speed is confirmed.

Example 3

A material obtained by adding an organic filler to H400 and a material obtained by adding an organic filler to H440 are extruded into pellets by a biaxial extruder, respectively, which are examined by a differential scanning calorimetry (DSC). As a measuring device is used Plyris-DSC7 made by Perkin-Elmer. The measuring temperature is adopted as room temperature (30° C.)→250° C. in the system added with the filler and as 30° C.→190° C. in the system not added with the filler. The temperature rising rate is 10° C./min. Further, the functional filler is used by graft-polymerizing Aerosil silica 300, PEG 600, trimethylol propane or pentaerythritol with 10, 30 or 50 molecules of D-lactic acid, respectively. The results on H400 are shown in Table 1, and the results on H440 are shown in Table 2.

TABLE 1

| Material | | Amount of D-lactic acid graft-polymerized | Amount of filler compounded | Melting point (° C.) | | |
|---|---|---|---|---|---|---|
| | | | | Tm1 | Tm2 | Tm3 |
| Starting material | H400 | | | 166.3 | | |
| Blend | Aerosil silica 300 | 30 molecules | 5 | 162.8 | 168.7 | 206.3 |
| | | | 10 | 165.7 | 199.4 | 209.6 |
| | | | 20 | 165.2 | | 209.6 |
| | PEG 600 | 30 molecules | 5 | 168.2 | 188 | |
| | | | 10 | 165.6 | 193.7 | |
| | | | 20 | 163.7 | 196.8 | |
| | | 50 molecules | 10 | 167.4 | 204.4 | |
| | trimethylol propane | 30 molecules | 5 | 166.4 | 186.5 | |
| | | | 10 | 166.6 | 187.6 | |
| | | | 20 | 163.7 | 190.8 | |
| | | 50 molecules | 5 | 164 | 167.7 | 190.6 |
| | | | 10 | 165 | 201.8 | 207.5 |
| | | | 20 | 166.4 | 200.4 | 206.4 |
| | pentaerythritol | 10 molecules | 5 | 165.8 | | |
| | | | 10 | 166 | | |
| | | | 20 | 163.9 | | |
| | | 30 molecules | 5 | 163.6 | 168.2 | 184.6 |
| | | | 10 | 164.6 | 185.7 | |
| | | | 20 | 164.5 | 195.8 | |
| | | 50 molecules | 5 | 169.6 | 192.2 | |
| | | | 10 | 167.3 | 182.3 | 200.6 |
| | | | 20 | 165.9 | 192.3 | 204.2 |

TABLE 2

| Material | | Amount of D-lactic acid graft-polymerized | Amount of filler compounded | Melting point (° C.) | | |
|---|---|---|---|---|---|---|
| | | | | Tm1 | Tm2 | Tm3 |
| Starting material | H440 | | | 147.3 | | |
| Blend | Aerosil silica 300 | 30 molecules | 5 | 147.3 | 187 | 203.9 |
| | | | 10 | 146.5 | 189.8 | 203.2 |
| | | | 20 | 145.8 | 194.5 | 202.5 |
| | PEG 600 | 30 molecules | 5 | 148.3 | 183.6 | |
| | | | 10 | 146.1 | 188.2 | 195.4 |
| | | | 20 | 145.9 | 183.7 | 193.6 |
| | | 50 molecules | 10 | 145.8 | 191.4 | |
| | trimethylol propane | 30 molecules | 5 | 149.6 | 179.7 | |
| | | | 10 | 162.6 | 180.4 | |
| | | | 20 | 143.4 | 184 | |
| | | 50 molecules | 5 | 148 | 184.1 | 194.3 |
| | | | 10 | 148.5 | 168 | 190.1 |
| | | | 20 | 146.8 | 183.4 | 192.7 |
| | pentaerythritol | 10 molecules | 5 | 145.5 | 189.9 | |
| | | | 10 | 147.3 | 162.9 | |
| | | | 20 | 146.1 | 160.6 | |
| | | 30 molecules | 5 | 149.2 | 172.7 | |
| | | | 10 | 148.3 | 174.2 | |
| | | | 20 | 147.9 | 179.5 | |
| | | 50 molecules | 5 | 148.4 | 168.8 | 187.3 |
| | | | 10 | 147 | 168.8 | |
| | | | 20 | 155.2 | 192.8 | 226.7 |

As shown in Table 1, only a melting point of 166.3° C. (Tm1) is observed in the single H400 system. On the other hand, one or two melting points (Tm2, Tm3) are further observed in the system containing Aerosil silica 300, PEG 600, trimethylol propane or pentaerythritol graft-polymerized with 30 or 50 molecules of D-lactic acid.

As shown in Table 2, only a melting point of 147.3° C. is observed in the single H440 system. On the other hand, one or two melting points are further observed in the system containing Aerosil silica 300, PEG 600, trimethylol propane or pentaerythritol graft-polymerized with 30 or 50 molecules of D-lactic acid. Even in the system graft-polymerized with 10 molecules of D-lactic acid, one melting point is further observed in addition to the melting point of the single H440 system.

These results show that L-lactic acid and D-lactic acid in the filler form a stereo-complex. The thus formed stereo-complex affects the crystallinity of the polylactic acid resin and is considered to contribute to the improvement of the heat resistance in the mouth portion of the preform shown in Examples 1 and 2.

INDUSTRIAL APPLICABILITY

In the preform obtained by compounding the resin made from poly-L-lactic acid with a functional filler and subjecting a mouth portion to a heat treatment according to the invention, the crystallinity of the mouth portion is improved and the heat resistance is good. Therefore, the invention can overcome the drawbacks of the conventional bottle made from the polylactic acid resin, and hence the invention technique contributes to practical application of bottles made from polylactic acid as an environment-friendly container.

What is claimed is:

1. A preform formed by compounding a resin made from poly-L-lactic acid with a functional filler comprising D-lactic acid, preparing a resin shaped body comprising a mouth portion from the resin compounded with the functional filler and subjecting the mouth portion of the shaped body to a heat treatment, wherein
the functional filler is formed by graft-polymerizing a compound having 2-4 hydroxyl groups with 30-50 molecules of D-lactic acid, the compound having 2-4 hydroxyl groups is selected from an inorganic compound of silica nanoparticles, trimethylol propane, and pentaerythritol, and
an amount of the functional filler compounded is 5-20% by weight based on the poly-L-lactic acid.

2. A preform according to claim 1, wherein the poly-L-lactic acid has a number average molecular weight of 60,000-80,000.

3. A preform according to claim 1, wherein the compound is an inorganic compound of silica nanoparticles.

4. A preform according to claim 1, wherein the compound is an organic compound selected from polyethylene glycol, trimethylol propane and pentaerythritol.

5. A preform according to claim 1, wherein the functional filler is formed by graft-polymerizing pentaerythritol having four hydroxyl groups with 50 molecules of D-lactic acid.

6. A preform according to claim 1, wherein the amount of the functional filler compounded is 10% by weight based on the poly-L-lactic acid.

7. A preform according to claim 1, wherein one or more melting points are existent in addition to a melting point of a single body of the resin made from poly-L-lactic acid.

8. A hollow shaped product formed by blow-molding a preform as claimed in claim 1.

9. A method of producing a preform which comprises steps of:
compounding a resin made from poly-L-lactic acid with a functional filler comprising D-lactic acid;
preparing a resin shaped body comprising a mouth portion through an extrusion molding;
compression molding or injection molding the resin compounded with the functional filler; and
subjecting the mouth portion of the shaped body to a heat treatment, wherein
the functional filler is formed by graft-polymerizing a compound having 2-4 hydroxyl groups with 30-50 molecules of D-lactic acid, the compound having 2-4 hydroxyl groups is selected from an inorganic compound of silica nanoparticles, trimethylol propane, and pentaerythritol, and
an amount of the functional filler compounded is 5-20% by weight based on the poly-L-lactic acid.

* * * * *